H. A. LANE AND P. G. LANG, Jr.
CONVEYER.
APPLICATION FILED JUNE 30, 1920.

1,436,508.

Patented Nov. 21, 1922.
7 SHEETS—SHEET 1.

Patented Nov. 21, 1922.

1,436,508

UNITED STATES PATENT OFFICE.

HARRY ALFRED LANE AND PHILIP GEORGE LANG, JR., OF BALTIMORE, MARYLAND, ASSIGNORS TO THE LANE-GALLOWAY CONVEYOR COMPANY, OF BALTIMORE, MARYLAND.

CONVEYER.

Application filed June 30, 1920. Serial No. 392,994.

*To all whom it may concern:*

Be it known that we, HARRY ALFRED LANE and PHILIP GEORGE LANG, Jr., both citizens of the United States, residing in Baltimore city, and State of Maryland, have invented certain new and useful Improvements in Conveyers, of which the following is a specification.

This invention relates particularly to conveyers of the kind employed for carrying material from an elevated conveyer forming part of a source of supply to vessels tied up at a dock or to other such carriers located at a lower level.

Our improvements are for the most part confined to mechanism at the lower end of a vertical chute, by means of which the material received from the chute is distributed in different parts of a vessel either above or below decks in such manner as to completely fill all parts of the storage spaces in the vessel. An apparatus of this general kind is usually called a "trimmer", and the object of this invention is to so improve "trimmers" that they may be more easily operated than heretofore, may be more readily shifted from one part of a vessel to another and inserted and withdrawn from its hatchways with greater ease, will more efficiently discharge material and deposit it where needed, may be more easily adjusted to suit varying conditions and will be self-cleaning so as to avoid clogging and thus insure an uninterrupted trimming operation wherever it takes place.

In carrying out our invention we connect our improved trimmer to a vertical chute which receives material from an elevated conveyer, such as a shuttle conveyer, carried preferably by a tower or like supporting structure movable along the dock. The chute is provided at its upper end with deflectors which tend to keep concentrated the material in the central part of the chute, and the chute is preferably made in telescopic sections in order that its length may be adjusted to enable the trimmer to deliver in different horizontal planes or that the chute may be condensed in a small space for transport. The trimmer is so mounted that it may be turned and set in various vertical planes to discharge the material horizontally in any desired direction. Between the lower portion of the chute and the discharge device of the trimmer we interpose an elbow equipped with a deflector plate which receives the force or impact of the descending material and directs it to the rear side of the elbow, and below the elbow we mount a delivery plate which guides the material to a discharge device preferably in the form of a short endless belt conveyer driven at such speed as to discharge the material with sufficient force to carry it any desired distance from the trimmer. The conveyer belt is driven by a motor, the speed of which may be varied, and the conveyer may be adjusted or inclined to the required extent to deliver the material either close to or far distant from the trimmer, or it may be dropped to a position removed from the outgoing material and thus to a large extent freed from wear. The belt is mounted in a frame or casing provided with means for automatically keeping it clear of dust while in operation. The apparatus is especially designed for loading vessels with coal and has been successfully used for this purpose. It is adapted, however, for loading vessels and other carriers with various materials.

The accompanying drawings show the general organization and many details of construction of an apparatus which has been successfully used by us, but it will be understood that our improvements may be embodied in other ways; the subject matter deemed novel is hereinafter specified.

In the accompanying drawings:—

The remaining figures are on an enlarged scale.

Figure 5ª is a detail view, in section, on the line 5ª—5ª of Fig. 5, showing particularly devices for discharging dust from the inside of the belt conveyer.

Figure 1:
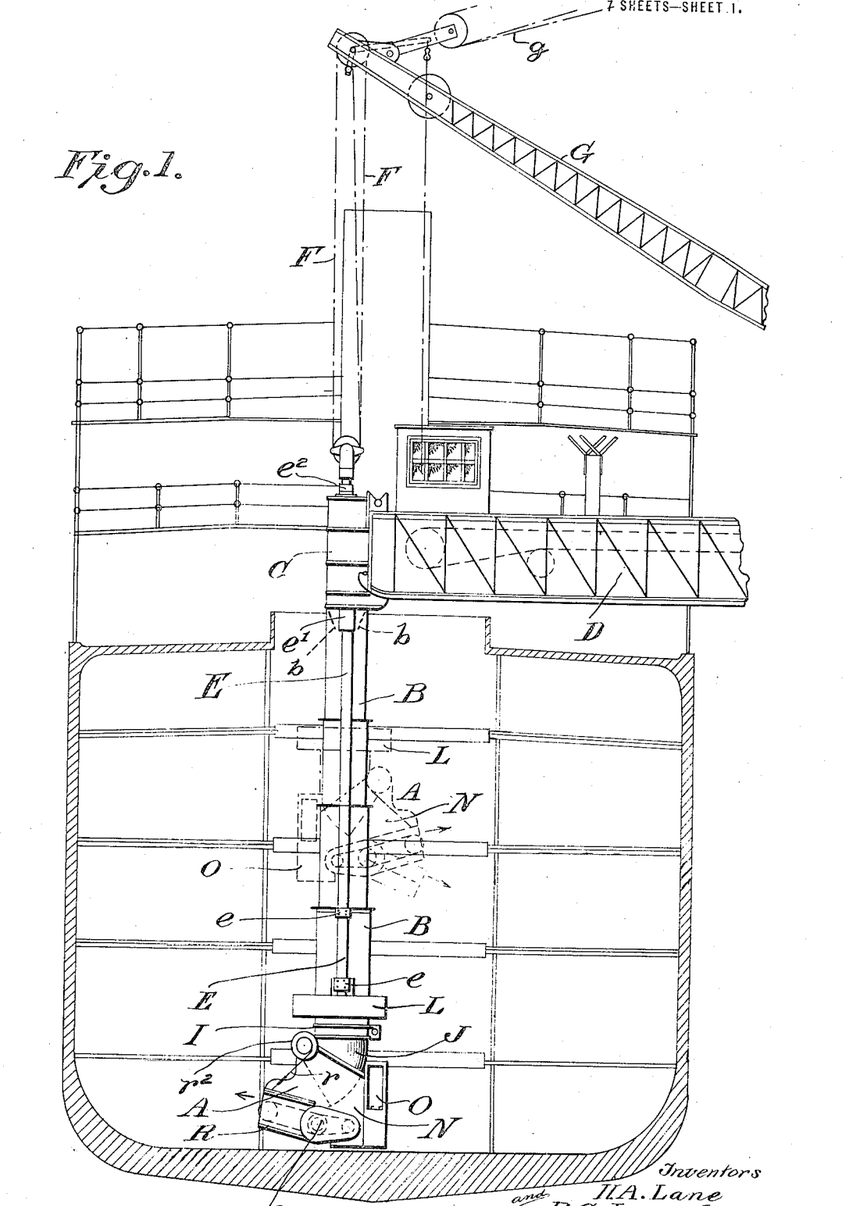
Figure 1 shows how our improved trimmer is employed to load a vessel lying at a pier. It shows the trimmer, its supply chute and means for raising and lowering it, and it also indicates how material is delivered by a shuttle conveyer to the upper portion of the chute.

As indicated in Fig. 1, the trimmer A is suspended from the lower end of a telescopic, collapsible, sectional chute B which is connected at its upper end to a hopper C which may be supported, when lowered, on the outer end of a horizontally arranged conveyer D—preferably a shuttle conveyer forming part of a tower or other structure which may be moved along the pier to any desired extent. The lower section of the chute is secured at $e$ to vertical pipes or hollow posts E which extend through guides $e'$ passing through the hopper, and these pipes are cross connected at $e^2$ in any suitable way. To the cross piece are connected hoist lines F, suspended from a boom G provided with tackle $g$ for raising and lowering it. The boom may be so supported as to turn about both vertical and horizontal axes.

By these devices the chute sections may be telescoped by means of the hoist lines F so as to bring all sections into a compact space below the hopper C, and the hopper with the chute sections and trimmer may be swung inward or outward to any desired position by proper operation of the boom.

The pipes E are rigid, i. e., they are not collapsible. They are firmly secured to the lower section of the chute and pass through guides in the hopper C, and thus provide a frame for keeping the chute sections in a true vertical plane as well as affording means for raising and lowering the chute sections and enclosing the electric cables.

As indicated in Fig. 1, the chute sections may be telescoped to any desired extent so that the trimmer may deliver in various horizontal planes to supply different storage compartments.

The sections of the chute below the hopper C may be rectangular in cross section and preferably we employ deflector plates $b$ at the top of the upper section which tend to concentrate the material in the center of the chute and thus to a large extent avoid wear on the sides of the chute as the material descends and thus also direct the material properly to the trimmer.

The lower end of the lower chute section is bolted at $b'$ to a casting H (Fig. 5) which has a circular portion $h'$ formed with annular flanges $h^2$ $h^3$ which receive between them antifriction balls or rollers $h^4$ contained within an annular oil chamber and which support an annular plate $i$, secured to an annular casting I to the lower end of which is bolted a curved elbow J, the function of which is hereinafter more particularly described.

Figures 5, 5A:
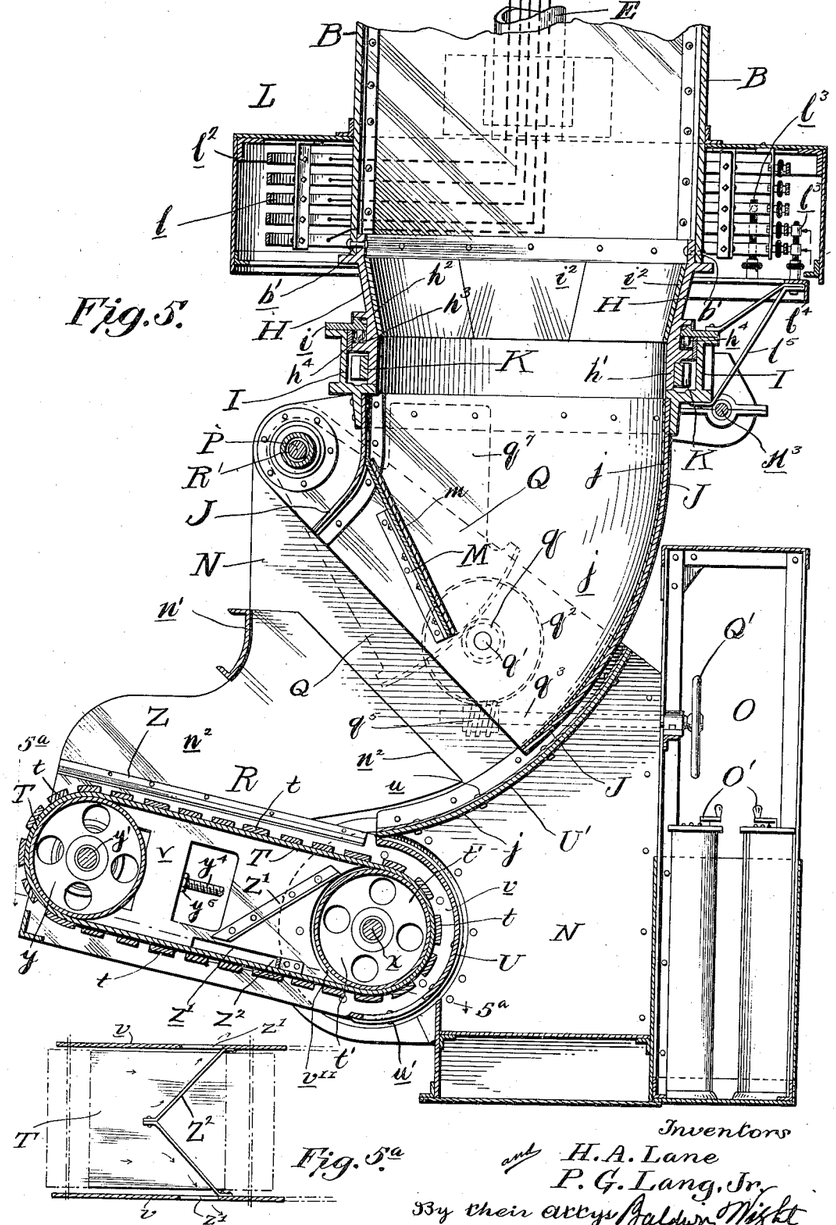
Figure 5 is a vertical section of the trimmer, showing also how it is supported and the electric contact devices for supplying current to the motors.
Figure 6:
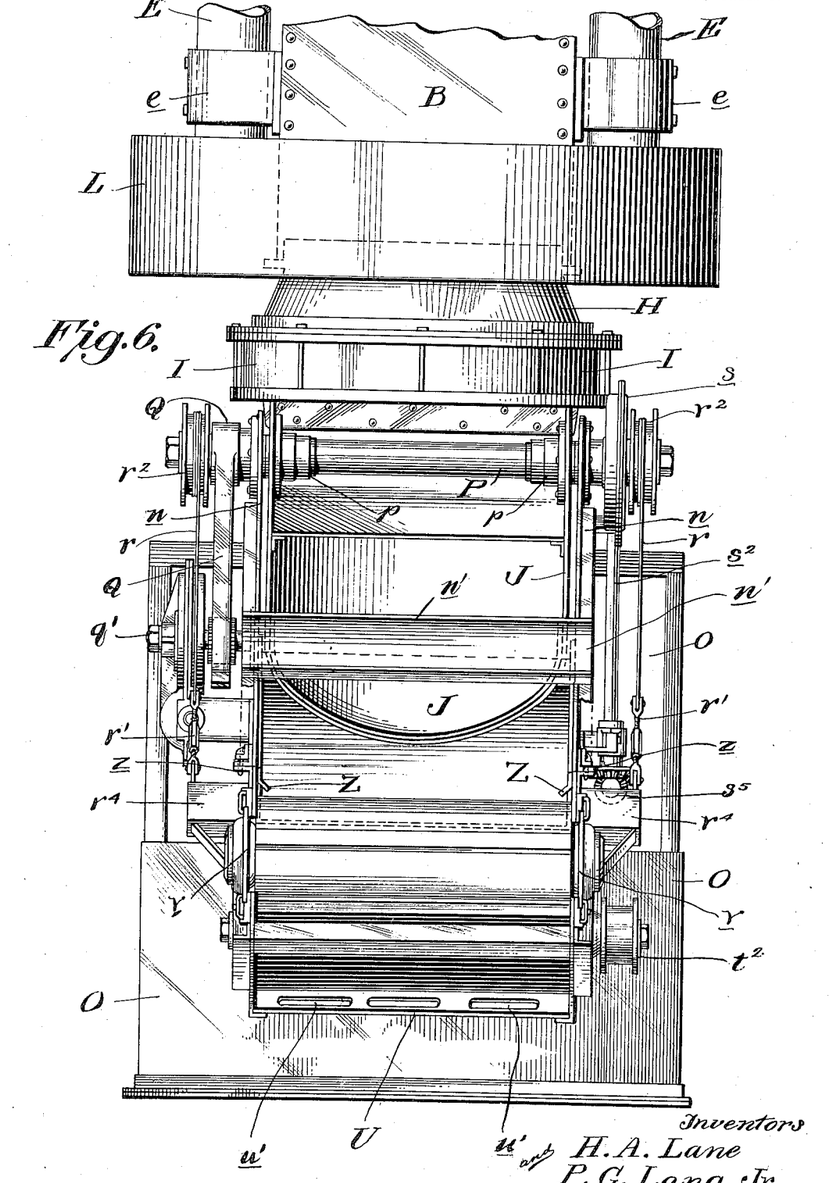
Figure 6 is a front view of the trimmer and other parts shown in Figs. 2 and 3.

It will be observed that the roller bearing connection between the chute and the elbow is dust proof and that the elbow may be easily turned about a vertical axis, to any desired extent. Wearing plates $i^2$ are secured within the casting H in such manner that they may be removed and replaced by new ones when required.

In order to turn the elbow about the vertical axis of the chute, we provide mechanism comprising a circular rack K, (Fig. 11) rigidly secured to the casting H and engaging a pinion $k$ on a short vertical shaft $k'$, to which is also secured a worm wheel $k^2$ engaging a worm $k^6$ on a horizontal shaft $k^3$ carrying a pinion $k^4$, which engages a spur wheel $k^5$ on the shaft of the electric motor K'.

Figures 11, 12, 13, 14:
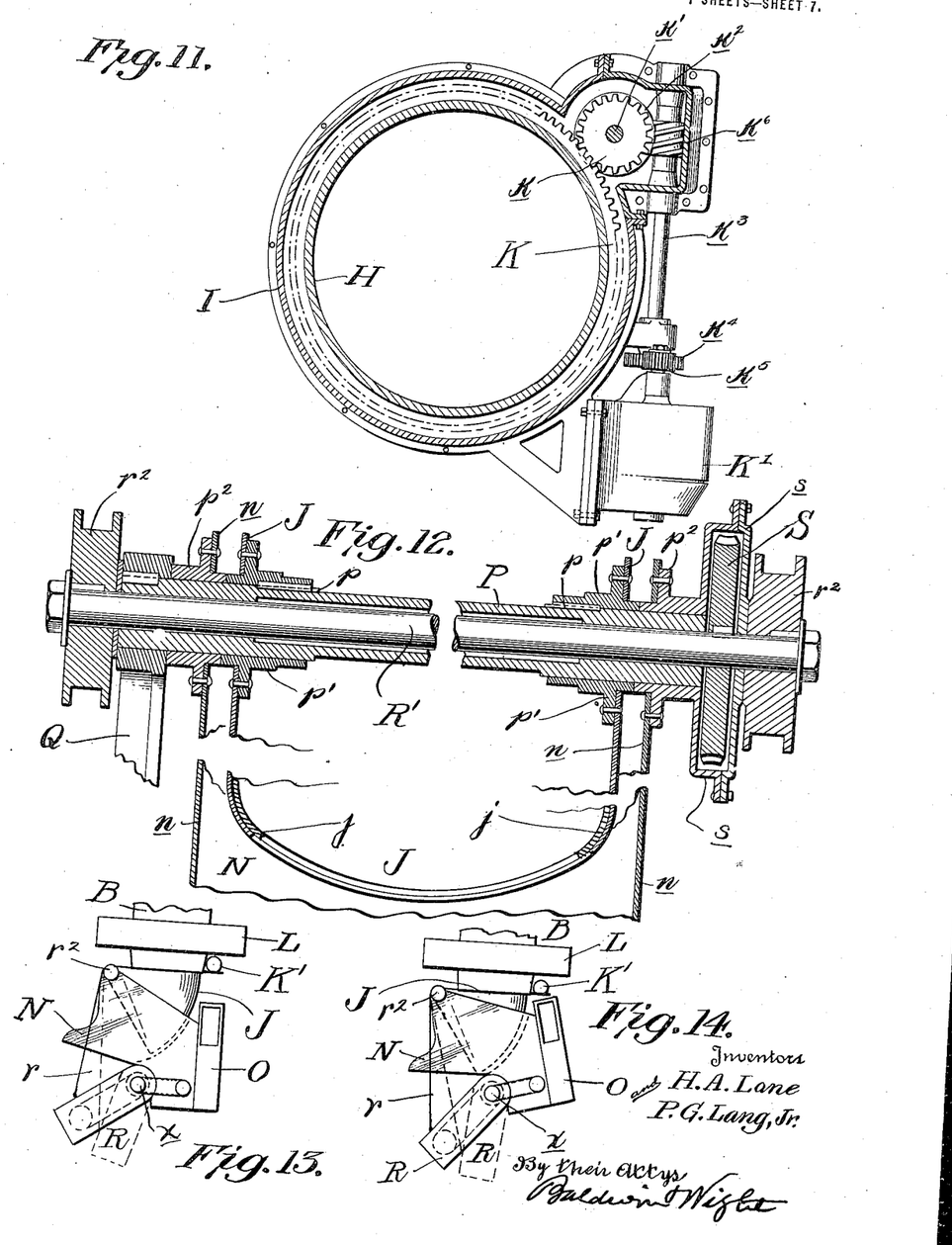
Figure 11 is a view, in horizontal section, showing the mechanism for moving the trimmer about a vertical axis.
Figure 12 is a view, in vertical section, showing the mechanism for tilting the trimmer and for raising and lowering the conveyer belt or discharge device.
Figures 13 and 14 are detail diagrammatic views, indicating different adjustments of the trimmer.

The motor and the gearing are housed, as shown, in order that they may be kept free from dust.

The motor is supplied with current from the contact devices L (Fig. 5) located above it. The contact devices and the circuit wires are so connected and operated as to convey the current not only to the motor K' but also to other motors employed for operating other parts of the mechanism.

Figures 7, 8, 9, 10:
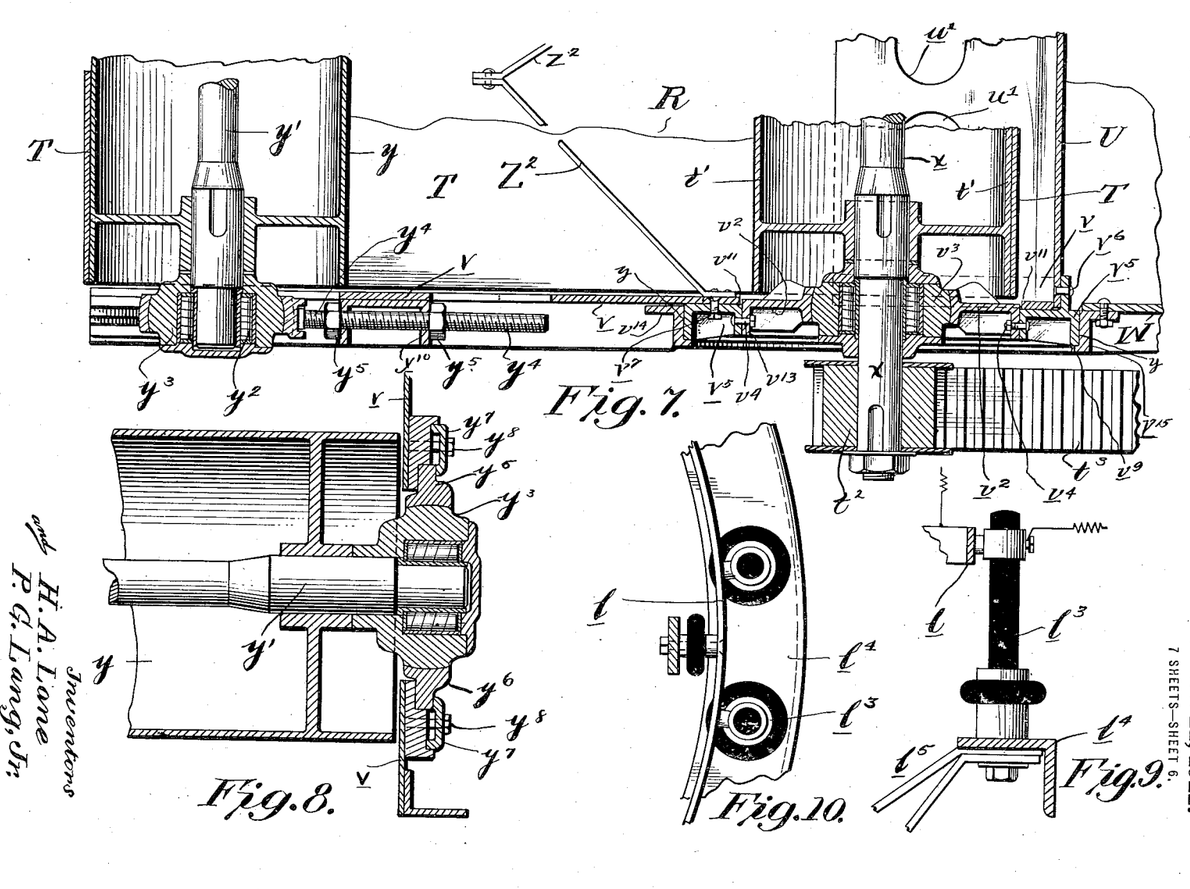
Figure 7 is a detail view, in longitudinal section, of the discharge device or conveyer belt.
Figure 8 is a detail view, in section, of the front belt pulley, showing one of its bearings.
Figures 9 and 10 are detail views of the electric contact devices.

Any suitable contact devices may be used. Those shown comprise a vertical series of collector rings $l$, connected to a casing or housing $l^2$ rigidly attached to the lower chute section. These rings are engaged by contacts on vertical posts $l^3$ carried by a segmental plate $l^4$, supported by brackets $l^5$ attached to the casting I.

By the gearing described, the elbow J may be turned in either direction about a vertical axis. The organization is also such that the motor and the gearing, which it operates, as well as the elbow J, move bodily around the rack which is fixed to the stationary casting H.

The parts below the casting H constitute the trimmer proper and are capable of rotation in either direction around the vertical axis of the chute. The elbow J receives material descending through the chute and delivers it to the discharge devices located below it. The elbow is curved, as shown, its upper end being bolted to the casting I. Its curved rear side is provided with removable wear-plates $j$ and its front portion carries an inclined deflector plate or baffle M which is detachably connected with the elbow and is provided with removable wear-plates $m$. The deflector is so inclined as to receive material descending through the chute and elbow and direct it to the rear wall of the elbow which, as before stated, is provided with wear-plates $j$ which may be removed and replaced when required.

While the elbow is free to turn about the vertical axis of the chute it has no other movement relative thereto. It, however, carries a trimmer frame N which is hung from the elbow and is adapted to swing about a horizontal axis, in the manner hereinafter explained. This trimmer comprises side plates $n$ which are braced at the front by a cross piece $n'$. The side plates carry removable wear-plates $n^2$ and they extend rearwards from the elbow and support a cab O for the operator and within which cab there are controllers O' for the electric circuits.

The trimmer frame is hung on a sleeve P (Fig. 12) which is keyed to the elbow at $p$ by means of the couplings $p'$ secured to the elbow. The trimmer frame is attached to flanged rings $p^2$ through which the sleeve extends and which are free to turn on the sleeve.

To one end of the sleeve is secured a toothed segment Q located outside the frame. The teeth of the segment engage a pinion $q$, carried by a shaft $q'$, mounted to turn in bearings in the side plates and carrying a worm gear, $q^2$, engaging a worm $q^5$ on a shaft $q^3$, operated by a hand wheel Q' in the cab. By these means the trimmer frame and the parts connected with it may be tilted to a limited extent. It will be understood that the sleeve does not turn. The segment is held rigidly by its arm $q^7$, rigidly attached to the casting I, but when the hand wheel is operated the pinion $q$ will ride along the toothed segment and the trimmer frame will be thus moved about the axis of the sleeve.

The trimmer frame supports a discharging device for the material which is preferably in the form of a short, endless conveyer belt, indicated generally at R. The frame or casing of the belt is connected by ropes $r$, having adjusting devices $r'$, with drums $r^2$ on a shaft R' extending through the sleeve P.

The conveyer frame is mounted to move about the axis $x$ of the rear belt pulley, in the manner hereinafter explained. The ropes $r$ are attached to laterally projecting portions $r^4$ of the belt frame and the opposite ends of the ropes are dead-ended on the drums $r^2$. The shaft R' has keyed to it near one end a worm wheel S contained within a housing $s$ and engaged by a worm $s'$ on a vertical shaft $s^2$, having bearings at $s^3$ and carrying a beveled pinion $s^4$ meshing with a similar pinion $s^5$ on a horizontal shaft $s^6$ carrying within the cab a spur wheel $s^7$ engaging a pinion $s^8$ on the shaft of a motor S'. This mechanism is under the control of the operator and may be actuated to drop the discharge belt and its frame out of the way of the descending material and it may also be operated to raise the belt and its frame to their normal position. The gears $s^4$ and $s^5$ are contained within a housing indicated by dotted lines $s^{10}$ in Fig. 2 and a housing $s^{11}$ protects the gears within the cab.

The endless conveyer belt T may be made of canvas or other suitable material and it is provided at suitable intervals with cross pieces or cleats $t$ in order to provide shoulders or projections which will take firm hold of the material, carry it forward and discharge it with such velocity as to carry it the desired distance from the trimmer. This belt should be of substantial construction as it has heavy duty although it is in a large degree protected by the special arrangement of the baffles, deflector plates, etc., employed.

The rear belt pulley $t'$ is keyed to the shaft $x$ which carries a sprocket pulley $t^2$ engaging a drive chain $t^3$ operated by a motor $t^4$. This mechanism, which is under the control of the operator, may be actuated to drive the belt at any desired speed.

A rear casing section U surrounds the rear portion of the rear belt pulley $t'$. Its upper front end joins but is not connected to a curved delivery plate U' having a removable wearing surface $u$. The plate U' is secured to the sides of the trimmer frame and swings therewith. It is so located as to clear the lower curved rear portion of the elbow. The lower portion of the casing section U is formed with openings $u'$, in order that any dust which tends to accumulate in this portion of the casing may be discharged.

The rear pulley $t'$ is so mounted that it may be withdrawn endwise from the trimmer. The devices employed for this purpose will be presently described.

The discharge conveyer frame in which the belt conveyer is supported comprises side plates $v$ reinforced and strengthened by angle irons $v^{10}$. At the rear the side plates are formed with aligned circular openings $v^{11}$ which are slightly larger in diameter than the rear pulley $t'$ in order that said pulley may be inserted and withdrawn endwise from the belt frame. The opening $v^{11}$ on one side of the frame is normally closed by an annular, sectional frame plate $v^2$ which surrounds the roller bearing $v^3$ of the shaft $x$ of the rear pulley. This frame plate $v^2$ is formed with an outwardly extending annular flange $v^{13}$ which is detachably connected by means of bolts $v^4$ with the outwardly extending flange of the annular frame section $v^5$ which is secured at $v^6$ to the casing section U (Fig. 7) and to a side plate $v$ at $v^7$.

Figure 2:
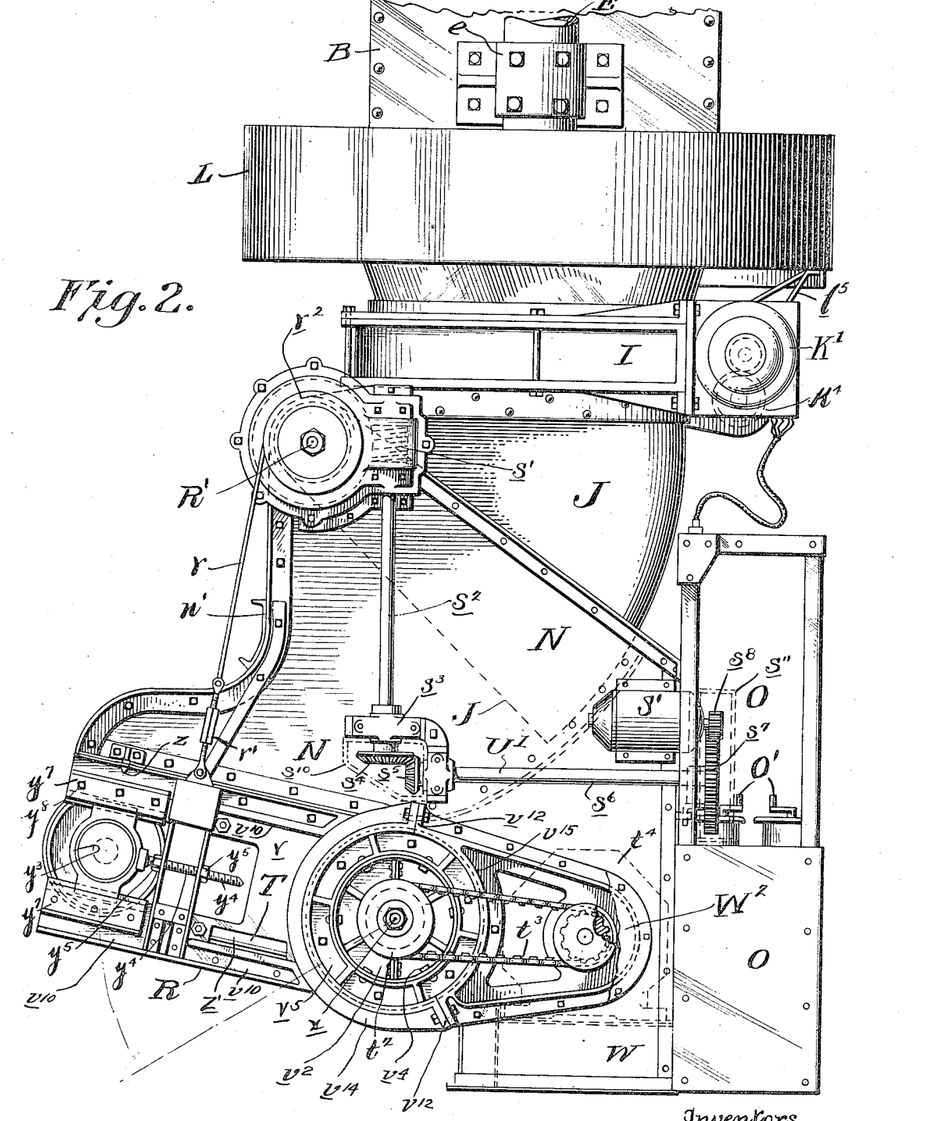
Figure 2 is a side view of the trimmer, showing also its connection with the lower section of the chute.

The rear portion of the frame section $v^5$ is held by the front flange $v^9$ of a frame section $v^{15}$, bolted to the lower rear portion W of the trimmer frame. The front portion of the frame section $v^5$ is held by a flanged front section $v^{14}$ which is detachably connected with the section $v^{15}$ at $v^{12}$ (Fig. 2).

By this construction one end of the pulley is held in its bearings and the belt frame may be turned bodily about a horizontal axis, having bearing surfaces at $y$. By merely withdrawing the bolts $v^4$ the plates $v^2$ may be withdrawn sidewise and with them the pulley and its bearings.

Figures 3, 4:
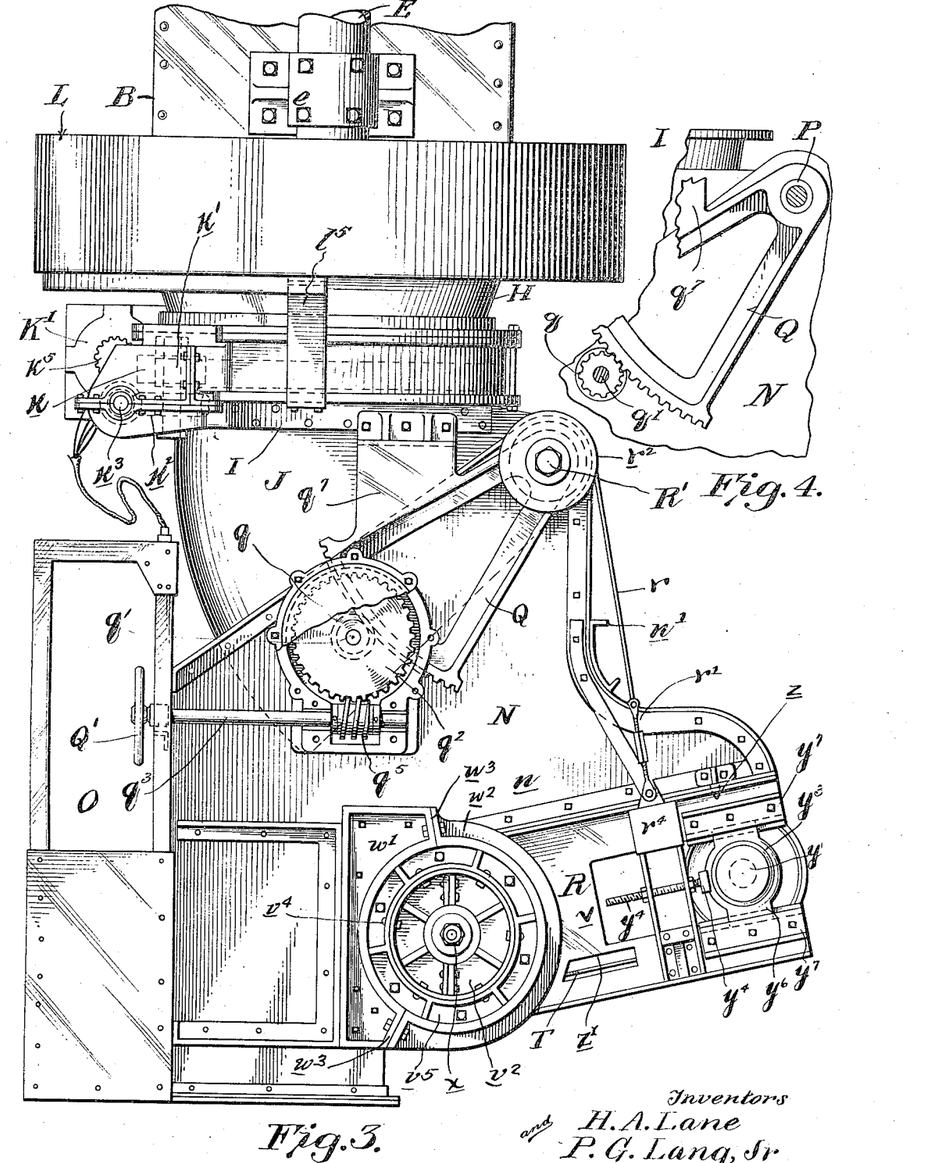
Figure 3 is a similar view of the opposite side of the trimmer.
Figure 4 is a detail view of a part of the mechanism for tilting the frame of the trimmer.

The opposite end of the rear pulley shaft is mounted in bearings similar to those before described and parts similar to those shown in Fig. 7 are indicated by similar reference characters in Fig. 3. In this instance, however, the frame section $v^5$ is held by a rear frame section $w'$, secured to the trimmer frame and the front portion of the section $v^5$ is held by a frame piece $w^2$, bolted to the section $w'$ at $w^3$.

When it is desired to remove the rear belt pulley, the bolts $v^4$ at opposite sides of the frame are detached and then the pulley and the parts permanently connected therewith may be removed endwise in either direction. This construction enables us to firmly support the rear end of the pulley frame and it also provides a way for turning the frame bodily about a horizontal axis so that when desired the conveyer may be dropped bodily from its normal, substantially horizontal, position or a slightly inclined position, to a nearly vertical position, as indicated in Figs. 13 and 14. When thus dropped the conveyer belt is not used for conveying or projecting material, which in such case passes out over the delivery plate U' without an increased velocity and without coming in forcible contact with the belt. In this way the life of the belt is often increased and this expedient is adopted when it is desired to discharge the material directly below the trimmer. By means of the ropes $r$ and the motor-operated gearing hereinbefore described the conveyer belt may be quickly returnd to its normal position in the trimmer frame, and in order that the belt frame may automatically find its correct position with reference to the trimmer frame, we provide devices $z$, consisting preferably of tapered lugs or pins extending downwardly from the trimmer frame and adapted to enter holes in the belt frame.

The sprocket pulley and the sprocket chain, as well as other parts associated with them, may be housed in a suitable casing to prevent dust from clogging the moving parts. In Fig. 2 a portion of such housing is shown at $W^2$.

The front or discharge pulley $y$ has its shaft $y'$ supported in roller bearings $y^2$, surrounded at each end by a sectional, annular casting $y^3$, against which bears a bolt $y^4$, carried by the flanged member $y^{10}$ of the sides $v$ of the belt frame and provided with adjusting nuts $y^5$. By these devices the front pulley may be moved endwise of the frame in such manner as to tighten the belt should it become slack. When the rear pulley is removed from the belt frame and withdrawn from the belt the front pulley with the belt may be withdrawn from the frame.

The casing sections $y^3$ are formed with upper and lower flanges $y^6$, entering grooves behind the plates $y^7$, secured to the sides $v$ of the frame by bolts $y^8$. The front pulley is, by these devices, held in place and is guided when inserted or withdrawn from the frame.

Flanged strips Z carried by the opposite side plates of the belt frame above the longitudinal edges of the top run of the belt serve to prevent dust from passing between the sides of the frame and the belt.

Inclined gutters Z' extend from the upper portion of the ends of the rear pulley forwards and downwards and serve to direct dust which may find its way between the belt runs to the inner side of the lower run of the belt in front of a stationary plow $Z^2$ which directs the dust in opposite directions to side openings $z'$ through which the dust passes. Any dust that falls on the inside of the lower run of the belt is carried rearwards thereby against the plow $Z^2$ which directs it to the opening $z'$.

It will be observed that provision is made for readily renewing or repairing the belt when it is injured or worn. While we have provided devices for relieving the belt as much as possible from strain, friction or impact it necessarily does very heavy work and must at intervals be removed and replaced. By removing the rear belt pulley in the manner before explained and by then withdrawing the front pulley and the belt longitudinally from the casing, the old belt may be withdrawn and by then placing the new belt over the front pulley, inserting the belt in its casing and then inserting the rear pulley in its frame and through the rear portion of the endless belt a new belt may be brought into service with great expedition.

If desired access may be had to the rear pulley through the holes u' in the curved casing section U.

The trimmer as a whole is of relatively small dimensions; that is to say, its width in its widest part is small compared with trimmers of the same class. The belt is a short one and the construction is such that the trimmer with its chute may be inserted in hatchways of small dimensions without moving the conveyer belt or discharge device to a vertical position or to any great extent from its normal level. The trimmer may be easily lowered into a vessel or carrier, may be quickly raised therefrom and moved to any desired place clear of the vessel or to different parts of the vessel. The operator in the cab has the mechanism under perfect control. By his hand-wheel he may give the trimmer the necessary inclination to obtain the desired range so that the material may be thrown to the desired distance without being conveyed to any great extent.

While provision is made for readily renewing the belt or discharge device, means are provided for relieving the belt to a large extent from wearing conditions. The trimmer may be turned about a vertical axis to discharge in any desired vertical plane and the chute may be conveniently lengthened or shortened as desired.

The electric contact devices, the gearing and other parts of the mechanism are well housed so that they may be well lubricated without contamination by dust or other matter. By providing means for cleaning or keeping clean different parts of the discharge device or belt conveyer an uninterrupted operation is secured.

The belt conveyor is usually driven at very high speed, such as 2700 feet per minute, or 30 miles per hour, and has been operated to discharge as high as 17 tons of bituminous coal per minute.

We claim as our invention:—

1. Loading apparatus, comprising a vertical, collapsible, sectional chute, a hopper delivering to the chute, a conveyer supplying the hopper, a boom from which the hopper is suspended, non-flexible pipes rigid from top to bottom having guides in the hopper, said pipes being connected to the lower section of the chute, and means connected with the pipes for raising them through the guides, thus telescoping the chute sections and raising them toward the hopper.

2. Loading apparatus, comprising a vertical, collapsible, sectional chute, a hopper delivering to the chute, a conveyer supplying the hopper, a boom from which the hopper is suspended, non-flexible pipes rigid from top to bottom, having guides in the hopper, said pipes being connected to the lower section of the chute and supported thereby, a trimmer frame supported by the elbow, means in the trimmer frame for discharging material passed through the elbow and means connected with the pipes for raising them through their guides, thus telescoping the chute sections and raising them with the trimmer frame toward the hopper.

3. Loading apparatus, comprising a chute, an elbow rotatably connected with the chute, motor mechanism for revolving the elbow about a vertical axis, a discharging conveyer to which the elbow delivers, a deflector in the upper front part of the elbow for directing material toward the rear side of the elbow and a delivery plate below and in rear of the elbow which directs material forwards to the discharge conveyer.

4. Loading apparatus, comprising a chute, an elbow rotatably connected with the chute, a discharge conveyer, a frame by which it is carried and which is mounted to move about a horizontal axis, means for guiding material from the elbow to the discharge conveyer and means, under the control of the operator, for moving the frame relatively to the elbow about its horizontal axis to vary the inclination of the discharge conveyer.

5. Loading apparatus, comprising a chute, a trimmer frame mounted at the lower end of the chute to move about both vertical and horizontal axes, a discharge conveyer supported by the trimmer frame and mounted to move therein about a horizontal axis, means for moving the trimmer frame about its horizontal axis and independent means for moving the discharge conveyer about its axis.

6. Loading apparatus, comprising a chute, a trimmer frame mounted at the lower end of the chute to turn about a vertical axis, means for moving the trimmer frame about its axis to vary the direction of discharge, a discharge conveyer mounted in the trimmer frame to turn about a horizontal axis and means for lowering the discharge conveyer independently of any movement given to the trimmer frame.

7. A trimmer, comprising an elbow, a trimmer frame connected with the elbow to move about a horizontal axis, a deflector within the elbow for directing material toward the rear side of the elbow, a discharge conveyer below the elbow and a guide carried by the trimmer frame in rear of the elbow which directs material from the elbow to the discharge conveyer.

8. Loading apparatus, comprising a sectional chute, an elbow at the lower end of the chute, gearing for moving the elbow about the vertical axis of the chute, housings for the gearing to keep them clear of dust, electric contact devices carried by the chute, non-flexible pipes rigid from top to bottom connected to the lower section of the chute for raising it and which serve as casings for electric wires leading to the contact devices and means connected with the pipes for raising them, thus telescoping the chute sections and raising them toward the hopper.

9. Loading apparatus, comprising a chute, a trimmer frame connected therewith to move about a horizontal axis, a sleeve mounted in bearings connected with the chute, a toothed segment connected with the sleeve and rigidly connected with the chute, a hand-wheel and gearing connecting the hand-wheel with the toothed segment whereby the trimmer frame may be swung bodily relatively to the chute about a horizontal axis.

10. A trimmer, comprising a trimmer frame, a discharge conveyor, a horizontally arranged shaft, connections between the discharge conveyer and the shaft by which the conveyer is held in place in the frame and motor driven gearing for raising and lowering the discharge conveyer.

11. The combination of a trimmer frame, a chute delivering thereto, a curved delivery plate secured to the trimmer frame below the lower end of the chute, and a discharge conveyer mounted in the trimmer frame comprising front and rear pulleys, a belt connecting them, side plates in which the pulleys are journaled and which are adapted to turn about the axis of one of said pulleys, and a casing section surrounding the rear portion of the rear pulley and turning with the conveyer frame about the axis of said pulley below and in close proximity to the lower or outer end of said curved delivery plate.

12. A trimmer, comprising a trimmer frame, a discharge conveyer frame connected therewith to move about a horizontal axis, means for raising and lowering the discharge conveyer frame, and devices for guiding the discharge conveyer frame to its connection with the trimmer frame when the discharge conveyer frame is raised.

13. Loading apparatus, comprising a high speed trimmer belt, a vertical, collapsible, sectional chute, a hopper delivering to the chute, non-flexible pipes rigid from top to bottom having guides in the hopper, said pipes being connected to the lower section of the chute and serving to hold the chute sections in a true vertical plane, deflector plates at the upper end of the chute for directing material toward the central portion of the chute and away from the sides thereof and to the trimmer below the chute to thus save wear on the sides of the chute sections and means connected with the pipes for raising them through their guides, thus telescoping the chute sections and raising them toward the hopper.

14. In a boat loading apparatus, the combination with a delivery chute, of a trimmer mounted on the lower end of the chute and swiveled for movement about the axis thereof, said trimmer having a delivery member adapted to be swung about a horizontal axis and provided with a delivery belt movably supported thereon so that the direction of feed can be varied without shifting the delivery member as a whole.

15. In a boat loading apparatus, the combination with a delivery chute, of a trimmer mounted at the lower end of the chute and comprising an upper portion and a movable delivery portion, said portions having parts forming a telescopic elbow joint, the angle of delivery of which may be varied by swinging the delivery member about an axis, and said delivery member having a feeding conveyer adapted to receive the material delivered by the telescopic elbow joint, said conveyer being adjustably supported by the delivery member so that its direction of feed can be varied.

16. In a boat loading apparatus, the combination with a delivery chute, of a trimmer composed of an upper portion swiveled on the lower part of the chute, and a delivery member mounted on said upper portion for movement about a horizontal axis, said upper portion and delivery member having parts forming an adjustable elbow, and a feeding conveyer extending beyond the elbow and adjustably supported on the delivery member so that its direction of feed may be varied.

17. In a boat loading apparatus, the combination with a delivery chute, of a trimmer supported at the lower end of the chute to turn about the axis thereof, and composed of an upper portion, a delivery member supported on said upper portion for swinging movement about a horizontal axis, an adjustable telescopic elbow carried in part by said upper portion and in part by the delivery member, and a conveyer and conveyer frame carried by the delivery member and extending beyond the said elbow, the conveyer frame being mounted for swinging movement on the delivery member.

18. In a boat loading apparatus, the combination with a delivery chute, of a trimmer supported at the lower end of the chute to turn about the axis thereof, and composed of an upper portion, a delivery member supported on said upper portion for swinging movement about a horizontal axis, an adjustable telescopic elbow carried in part by said upper portion and in part by the delivery member, a conveyer and conveyer frame carried by the delivery member and extending beyond the said elbow, the conveyer frame being mounted for swinging movement on the delivery member, and means carried by the trimmer for swinging the delivery member about its axis and for swinging the conveyer frame on the delivery member.

19. The combination of a chute, a discharge section carried thereby to turn about a vertical axis, a trimmer frame pivotally connected with said discharge section to turn about a horizontal axis, a discharge conveyer in said trimmer frame, motor mechanism geared to the discharge section and to the discharge conveyer for operating them, collector rings carried by the chute, contact devices engaging the rings and movable relatively thereto, and means for supplying current from a source of supply to the rings and contact devices and therefrom to said motor mechanism.

20. The combination of a chute, an elbow on the lower end thereof mounted to turn about a vertical axis, a trimmer frame pivotally connected with said elbow to turn about a horizontal axis, a discharge conveyer in said trimmer frame below the elbow, motor mechanism geared to the elbow and to the discharge conveyer for operating them, collector rings mounted in a housing at the lower end of the chute, contact posts supported on the elbow and turning therewith and engaging the rings, and means for supplying current from a source of supply to the rings and contact and therefrom to said motor mechanism.

In testimony whereof, we have hereunto subscribed our names.

HARRY ALFRED LANE.
PHILIP GEORGE LANG, Jr.